US009259798B2

(12) United States Patent
Morrisroe (10) Patent No.: US 9,259,798 B2
(45) Date of Patent: Feb. 16, 2016

(54) TORCHES AND METHODS OF USING THEM (71) Applicant: Peter Morrisroe, New Milford, CT (US)

(72) Inventor: Peter Morrisroe, New Milford, CT (US)

(73) Assignee: PerkinElmer Health Sciences, Inc., Waltham, MA (US)

( * ) Notice: Subject to any disclaimer, the term of this patent is extended or adjusted under 35 U.S.C. 154(b) by 156 days.

(21) Appl. No.: 13/940,077

(22) Filed: Jul. 11, 2013

(65) Prior Publication Data
US 2014/0021173 A1   Jan. 23, 2014

Related U.S. Application Data (60) Provisional application No. 61/671,291, filed on Jul. 13, 2012, provisional application No. 61/781,758, filed on Mar. 14, 2013.

(51) Int. Cl.
*B23K 10/00* (2006.01)
*B23K 10/02* (2006.01)
*H05H 1/30* (2006.01)

(52) U.S. Cl.
CPC . *B23K 10/02* (2013.01); *H05H 1/30* (2013.01)

(58) Field of Classification Search
CPC ... H05H 1/30; H05H 1/34; H05H 2001/4652; H05H 1/3405; H05H 1/342; B23K 10/02
USPC ............ 219/121.52, 121.51, 121.48, 121.49; 315/111.51
See application file for complete search history.

(56) References Cited

U.S. PATENT DOCUMENTS

| 1,958,406 | A |   | 5/1934  | Darrah |
|-----------|---|---|---------|--------|
| 2,708,341 | A |   | 5/1955  | Zucrow |
| 2,833,371 | A |   | 5/1958  | Honma |
| 2,847,899 | A |   | 8/1958  | Walsh |
| 3,004,137 | A |   | 10/1961 | Karlovitz |
| 3,052,614 | A |   | 9/1962  | Herold |
| 3,224,485 | A |   | 12/1965 | Blomgren |
| 3,248,513 | A |   | 4/1966  | Sunnen |
| 3,264,508 | A |   | 8/1966  | Lai |
| 3,324,334 | A | * | 6/1967  | Reed ........................ 313/231.31 |
| 3,370,966 | A |   | 2/1968  | Schwartz |
| 3,408,283 | A |   | 10/1968 | Chopra |
| 3,416,870 | A |   | 12/1968 | Wright |

(Continued)

FOREIGN PATENT DOCUMENTS

EP   281158   9/1988
EP   602764   6/1994

(Continued)

OTHER PUBLICATIONS

IPRP for PCT/US2013/050130.

(Continued)

*Primary Examiner* — Mark Paschall
(74) *Attorney, Agent, or Firm* — Rhodes IP PLC; Christopher R Rhodes (57) ABSTRACT

Certain embodiments described herein are directed to a torch that includes a suitable amount of a refractory material. In some embodiments, the torch can include one or more non-refractory materials in combination with a refractory material. In some embodiments, the torch can comprise a refractory material and an optically transparent window. In other embodiments, the torch can comprise a material comprising a melting point higher than the melting point of quartz.

20 Claims, 7 Drawing Sheets

(56) References Cited

U.S. PATENT DOCUMENTS

| | | |
|---|---|---|
| 3,428,401 A | 2/1969 | Buzza |
| 3,492,074 A | 1/1970 | Rendina |
| 3,619,061 A | 11/1971 | Mitchell |
| 3,668,066 A | 6/1972 | Hendel |
| 3,958,883 A | 5/1976 | Turner |
| 4,004,117 A | 1/1977 | Amsler |
| 4,118,618 A | 10/1978 | Gauthier |
| 4,256,404 A | 3/1981 | Walker |
| 4,263,089 A | 4/1981 | Keller |
| 4,293,220 A | 10/1981 | Denton |
| 4,300,834 A | 11/1981 | Demers |
| 4,362,936 A | 12/1982 | Hofmann |
| 4,419,575 A | 12/1983 | Lakatos |
| 4,482,246 A | 11/1984 | Meyer |
| 4,540,884 A | 9/1985 | Stafford |
| 4,575,609 A | 3/1986 | Fassel |
| 4,578,583 A | 3/1986 | Ciammaichella |
| 4,578,589 A | 3/1986 | Aitken |
| 4,629,940 A | 12/1986 | Gagne |
| 4,640,627 A | 2/1987 | Tracy |
| 4,736,101 A | 4/1988 | Syka |
| 4,766,287 A | 8/1988 | Morrisroe |
| 4,782,235 A | 11/1988 | Lejeune |
| 4,795,880 A | 1/1989 | Hayes |
| 4,798,464 A | 1/1989 | Boostrom |
| 4,812,166 A | 3/1989 | Saiki |
| 4,818,916 A | 4/1989 | Morrisroe |
| 4,886,359 A | 12/1989 | Berndt |
| 4,897,282 A | 1/1990 | Kniseley |
| 4,906,900 A | 3/1990 | Asmussen |
| 4,955,717 A | 9/1990 | Henderson |
| 5,024,725 A | 6/1991 | Chen |
| 5,083,004 A * | 1/1992 | Wells et al. ............... 219/121.5 |
| 5,200,595 A * | 4/1993 | Boulos et al. ............ 219/121.52 |
| 5,217,362 A | 6/1993 | Thompson |
| 5,259,254 A | 11/1993 | Zhu |
| 5,308,977 A | 5/1994 | Oishi |
| 5,334,834 A | 8/1994 | Ito |
| 5,356,674 A | 10/1994 | Henne |
| 5,438,194 A | 8/1995 | Koudijs |
| 5,468,955 A | 11/1995 | Chen |
| 5,526,110 A | 6/1996 | Braymen |
| 5,534,998 A | 7/1996 | Eastgate |
| 5,597,467 A | 1/1997 | Zhu |
| 5,640,841 A | 6/1997 | Crosby |
| 5,648,701 A | 7/1997 | Hooke |
| 5,680,014 A | 10/1997 | Miyamoto |
| 5,818,581 A | 10/1998 | Kurosawa |
| 5,916,455 A | 6/1999 | Kumagai |
| 5,958,258 A | 9/1999 | Ishihara |
| 5,975,011 A | 11/1999 | Ohkusa |
| 5,994,697 A | 11/1999 | Kato |
| 6,033,481 A | 3/2000 | Yokogawa |
| 6,041,735 A | 3/2000 | Murzin |
| 6,080,271 A | 6/2000 | Fujii |
| 6,227,465 B1 | 5/2001 | Kelly |
| 6,236,012 B1 | 5/2001 | Carre |
| 6,248,998 B1 | 6/2001 | Okumoto |
| 6,329,757 B1 | 12/2001 | Morrisroe |
| 6,447,636 B1 * | 9/2002 | Qian et al. ............... 156/345.48 |
| 6,453,660 B1 | 9/2002 | Johnson |
| 6,541,766 B2 | 4/2003 | Kato |
| 6,614,021 B1 | 9/2003 | Kalinitchenko |
| 6,617,794 B2 | 9/2003 | Barnes |
| 6,621,078 B2 | 9/2003 | Taniguchi |
| 6,627,877 B1 | 9/2003 | Davis |
| 6,639,227 B1 | 10/2003 | Glavish |
| 6,809,312 B1 | 10/2004 | Park |
| 6,899,787 B2 | 5/2005 | Nakano |
| 7,106,438 B2 | 9/2006 | Morrisroe |
| 7,114,337 B2 | 10/2006 | Cazalens |
| 7,119,330 B2 | 10/2006 | Kalinitchenko |
| 7,125,525 B2 * | 10/2006 | Mauro ....................... 422/186 |
| 7,276,688 B2 | 10/2007 | Weiss |
| 7,323,655 B2 | 1/2008 | Kim |
| 7,511,246 B2 | 3/2009 | Morrisroe |
| 7,622,693 B2 | 11/2009 | Foret |
| 7,737,397 B2 | 6/2010 | Morrisroe |
| 7,742,167 B2 | 6/2010 | Morrisroe |
| 7,880,147 B2 | 2/2011 | Morrisroe |
| 7,967,945 B2 * | 6/2011 | Glukhoy et al. ......... 156/345.48 |
| 8,071,906 B2 * | 12/2011 | Smiljanic et al. ........ 219/121.49 |
| 2002/0125425 A1 | 9/2002 | Kato |
| 2003/0184234 A1 | 10/2003 | Hsu |
| 2004/0001295 A1 | 1/2004 | Kumar |
| 2004/0124779 A1 | 7/2004 | Howald et al. |
| 2004/0169855 A1 | 9/2004 | Morrisroe |
| 2004/0173579 A1 | 9/2004 | Carr |
| 2004/0206730 A1 * | 10/2004 | Holber et al. ............. 219/121.52 |
| 2004/0219737 A1 | 11/2004 | Quon |
| 2005/0082471 A1 | 4/2005 | Kalinitchenko |
| 2006/0136158 A1 | 6/2006 | Goldberg |
| 2006/0163468 A1 | 7/2006 | Wells |
| 2006/0285108 A1 | 12/2006 | Morrisroe |
| 2006/0286492 A1 | 12/2006 | Morrisroe |
| 2007/0084834 A1 * | 4/2007 | Hanus et al. ................ 219/121.5 |
| 2008/0017794 A1 | 1/2008 | Verbeck |
| 2008/0173810 A1 | 7/2008 | Morrisroe |
| 2010/0225909 A1 * | 9/2010 | Feilders et al. ............... 356/316 |

FOREIGN PATENT DOCUMENTS

| | | |
|---|---|---|
| EP | 0673186 | 9/1995 |
| EP | 1891407 | 2/2008 |
| JP | 56000911 | 1/1981 |
| JP | 59207828 | 11/1984 |
| JP | 62273047 | 11/1987 |
| JP | 1109648 | 4/1989 |
| JP | 1124951 | 5/1989 |
| JP | 2001265500 | 10/1989 |
| JP | 4008873 | 1/1992 |
| JP | 05-288682 | 11/1993 |
| JP | 06027083 | 2/1994 |
| JP | 6283484 | 10/1994 |
| JP | 7057893 | 3/1995 |
| JP | 7153420 | 6/1995 |
| JP | 7211489 | 8/1995 |
| JP | 07307199 | 11/1995 |
| JP | 10-022096 | 2/1998 |
| JP | 11258163 | 9/1999 |
| JP | 2001-183297 | 7/2001 |
| JP | 2002343599 | 11/2002 |
| JP | 2003168594 | 6/2003 |
| JP | 2003168595 | 6/2003 |
| JP | 2003194273 | 7/2003 |
| JP | 2003215042 | 7/2003 |
| JP | 2006-516325 | 6/2006 |
| JP | 2005018688 | 7/2007 |
| WO | 8806834 | 9/1988 |
| WO | 9638856 | 12/1996 |
| WO | 2004055493 | 7/2004 |

OTHER PUBLICATIONS

EP Communication for EP06748915.8.
First Official Action for CN 200680021600.X.
International Search Report/Written Opinion for PCT/US2006/0232777.
Second Official Action for CN200680021600.X.
Official Action for Australian Patent Application No. 2006284864.
First official action for JP2008529236.
International Search Report/Written Opinion for PCT/US06/008687.
Eden et al. J. Phys. D: Apply. Phys. 36: 2869-2877, Dec. 2003.
Kikuchi et al. J. Phys D: Appl. Phys. 37: 1537-1543, Jun. 2004.
Boswell et al. IEEE Transaction on Plasma Sciences, 25: Dec. 1997.
First official action for CN200680006366.2.
First official action for AU2006223254.
First official action for JP500981/2008.
International Search Report/Written Opinion for PCT/US2009/000278 dated Oct. 6, 2009.
Eden et al. J. Phys. D: Appl. Phys. 36: 2869-2877, Dec. 2003.
Kikuchi et al. J. Phys. D: Appl. Phys 37: 1537-1543, Jun. 2004.

(56) References Cited

OTHER PUBLICATIONS

Boswell et al. IEEE Transactions on Plasma Science, 25: Dec. 1997.
EP Communication for EP06784915.8.
Second Official Action for CN 200680021600.X.
IPRP for PCT/US2006/223277 dated Dec. 2007.
First official action for Australian Patent Application No. 2006259381.
International Search/Written Opinion for IPCT/US2006/223277 dated Dec. 2007.
Official Action for AU 2003293514.

* cited by examiner

TORCHES AND METHODS OF USING THEM

PRIORITY APPLICATIONS

This application claims priority to each of U.S. Application No. 61/671,291 filed on Jul. 13, 2012 and U.S. Application No. 61/781,758 filed on Mar. 14, 2013, the entire disclosure of each of which is hereby incorporated herein by reference for all purposes.

TECHNOLOGICAL FIELD

This application is related to torches that can be used to sustain an atomization source. In certain embodiments, the torch can comprise at least one refractory material in an effective amount or region to increase the torch life. In other embodiments, the torch can comprise a material comprising a melting point higher than the melting point of quartz.

BACKGROUND

A torch is typically used to sustain an atomization source such as a plasma. The high temperatures can greatly reduce the lifetime of the torch.

SUMMARY

In one aspect, a torch comprising a body configured to sustain an atomization source in the body, in which at least an exit end of the body comprises at least one refractory material is provided.

In certain embodiments, the refractory material is coated onto the body of the torch. In some embodiments, the refractory material is present in an effective length along the longitudinal dimension of the torch body. In other embodiments, the refractory material is present in an effective thickness at the terminal region. In certain examples, the entire body comprises the refractory material. In some embodiments, the body comprises an opening configured to receive an optically transparent material, e.g., a window that can transmit or pass light in a radial direction from the torch. In some examples, the body comprises an outer tube and an inner tube within the outer tube, in which the refractory material is present on one of the inner tube and the outer tube. In additional examples, the body comprises an outer tube and an inner tube within the outer tube, in which the refractory material is present on both the inner tube and the outer tube. In some examples, the body comprises a non-refractory material at an entrance end and the refractory material at the exit end. In other examples, the refractory material and non-refractory material are coupled to each other with an adhesive or cement, e.g., 904 Zirconia cement.

In some embodiments, the refractory material and non-refractory material are fused to each other. In certain embodiments, the refractory material and non-refractory material are coupled to each other through a frit or a ground glass joint. In certain examples, the body comprises in which the body comprises an outer tube and an inner tube within the outer tube, in which the inner tube comprises a non-refractory material at an entrance end and the refractory material is at an exit end of the inner tube. In certain embodiments, the refractory material and non-refractory material are coupled to each other with an adhesive or cement, e.g., 904 Zirconia cement. In some embodiments, the refractory material and non-refractory material are fused to each other. In certain examples, the refractory material and non-refractory material are coupled to each other through a frit or a ground glass joint. In other examples, the body comprises an outer tube and an inner tube within the outer tube, in which the inner tube comprises the refractory material and an optically transparent window. In certain embodiments, the optically transparent window is configured to permit visual observation of an atomization source within the inner tube. In some embodiments, the optically transparent window is configured to pass visible light.

In additional examples, the refractory materials comprise at least one of alumina, zirconia, yttria, ceria, silicon nitride, boron nitride or refractory materials or ceramics that have working temperature greater than 1600 degrees Celsius or greater than 2000 degrees Celsius.

In another aspect, a torch comprising a hollow cylindrical outer tube and a hollow cylindrical inner tube within the hollow cylindrical outer tube, the hollow cylindrical outer tube comprising a fluid inlet configured to receive a cooling gas flow to cool outer surfaces of the hollow cylindrical inner tube, the hollow cylindrical inner tube configured to receive a gas effective to sustain an atomization source in the hollow tube, in which an exit end of the hollow cylindrical outer tube comprises a refractory material.

In certain embodiments, an exit end of the hollow cylindrical inner tube comprises a refractory material. In some embodiments, an entrance end of the hollow cylindrical outer tube comprises a non-refractory material. In further embodiments, the non-refractory material and the refractory material are coupled to each other. In some examples, the refractory material and the non-refractory material are coupled to each other through one or more of an adhesive, cement, a frit, a ground glass joint or are fused to each other. In additional examples, the refractory material of the outer tube comprises an effective length in the longitudinal direction of the inner tube. In some examples, the refractory material is coated onto an inner surface of the exit end of the outer hollow cylindrical tube. In certain embodiments, the exit end comprises solid refractory material. In other embodiments, the refractory material is present at an effective thickness to prevent degradation of the exit end of the outer tube.

In an additional aspect, a torch comprising a hollow cylindrical tube with an entrance end comprising a non-refractory material and an exit end comprising a refractory material, in which the non-refractory material and the refractory material are coupled to each other to provide a substantially fluid tight seal between the entrance end and the exit end is provided.

In certain embodiments, the refractory material and non-refractory material are coupled with an adhesive or cement, e.g., 904 Zirconia cement. In other embodiments, the refractory material and non-refractory material are fused to each other. In some examples, the refractory material and non-refractory material are coupled to each other through a frit or a ground glass joint. In some embodiments, the torch comprises a hollow cylindrical inner tube within the hollow cylindrical tube, the inner tube configured to sustain an atomization source.

In another aspect, a torch comprising a refractory material outer tube and an optically transparent window in the refractory material outer tube is provided.

In certain embodiments, the optically transparent window is at an entrance end of the torch. In other embodiments, the optically transparent window is configured to permit passage of visible wavelengths of light. In additional embodiments, a second optically transparent window configured to permit measurement of absorption of light by species in the torch can be present. In some embodiments, a refractory material inner tube positioned within the refractory material outer tune, in which the refractory material inner tube comprises an optically transparent window can be present. In some instances, the optically transparent window of the inner tube is aligned with the optically transparent window of the outer tube. In additional examples, the torch can include an additional optically transparent window in the refractory material outer tube. In some embodiments, the optically transparent window is fused to the refractory material outer tube. In some embodiments, the optically transparent window is coupled to the refractory material outer tube through a frit or a ground glass joint.

In an additional aspect, a system for sustaining an atomization source comprising a torch comprising a hollow cylindrical outer tube comprising an entrance end and an exit end, in which the exit end comprises a refractory material in an effective length to prevent degradation of the exit end of the torch, and an induction device comprising an aperture configured to receive the torch and provide radio frequency energy to the torch to sustain the atomization source in the body of the torch. In some embodiments, the refractory material may be present in an effective amount.

In certain examples, the induction device can be configured as a helical coil. In other embodiments, the induction device can be configured as at least one plate electrode. In further embodiments, the induction device can be configured as two plate electrodes. In some examples, the induction device can be configured as three plate electrodes.

In some embodiments, the torch further comprises an inner hollow cylindrical tube comprising an entrance end and an exit end, in which the exit end of the inner hollow tube comprises a refractory material in an effective length and an effective amount to prevent degradation of the exit end of the inner hollow tube. In certain examples, the system can include a radio frequency energy source electrically coupled to the induction device. In some embodiments, the system can include a detector configured to detect excited species in the torch body. In other embodiments, the system can include a mass spectrometer fluidically coupled to the torch body and configured to receive species exiting from the torch body.

In another aspect, a system for sustaining an atomization source comprising a torch comprising a hollow cylindrical outer tube comprising an entrance end and an exit end and a hollow cylindrical inner tube comprising an entrance end and an exit end, in which the inner tube is positioned in the outer tube, in which the exit end of the outer tube comprises a refractory material in an effective length and an effective amount to prevent degradation of the exit end of the outer tube, and an induction device comprising an aperture configured to receive the torch and provide radio frequency energy to the torch to sustain the atomization source in the body of the torch.

In certain embodiments, the induction device is configured as a helical coil. In other embodiments, the induction device is configured as at least one plate electrode. In some examples, the induction device is configured as two plate electrodes. In other examples, the induction device is configured as three plate electrodes. In some embodiments, the inner tube further comprises a refractory material at the exit end. In other examples, the system can include a radio frequency energy source electrically coupled to the induction device. In some embodiments, the system can include a detector configured to detect excited species in the torch body. In certain examples, the system can include a mass spectrometer fluidically coupled to the torch body and configured to receive species exiting from the torch body.

In an additional aspect, a method of reducing degradation of a torch configured to sustain an atomization source, the method comprising providing a torch comprising a hollow cylindrical outer tube comprising an entrance end and an exit end, in which the exit end comprises an effective amount of a refractory material is provided.

In certain embodiments, the method can include configuring the refractory material to be present at an effective length in a longitudinal direction of the torch and along an internal surface of the outer tube of the torch. In other embodiments, the method can include configuring the refractory material to be coated onto the inner surface of the outer tube of the torch. In further embodiments, the method can include configuring the refractory material to be at least one of alumina, yttria, ceria, boron nitride, silicon nitride and other refractory materials. In certain examples, the method can include configuring the torch with a hollow cylindrical inner tube comprising an entrance end and an exit end, in which the exit end of the inner tube comprises an effective amount of a refractory material.

In another aspect, a method of reducing degradation of a torch configured to sustain an atomization source, the method comprising providing a torch comprising a hollow cylindrical outer tube comprising an entrance end and an exit end and a hollow cylindrical inner tube within the hollow cylindrical outer tube, in which the hollow cylindrical inner tube comprises an entrance end and an exit end and in which the exit end of the outer tube comprises an effective amount of a refractory material is described.

In certain embodiments, the method can include configuring the refractory material to be present at an effective length in a longitudinal direction of the torch and along an internal surface of the outer tube of the torch. In other embodiments, the method can include configuring the refractory material to be coated onto the inner surface of the outer tube of the torch. In some embodiments, the method can include configuring the refractory material to be at least one of alumina, yttria, ceria, boron nitride, silicon nitride and other refractory materials. In some examples, the method can include configuring the torch with a hollow cylindrical inner tube comprising an entrance end and an exit end, in which the exit end of the inner tube comprises an effective amount of a refractory material.

In another aspect, a torch comprising a body configured to sustain an atomization source in the body, in which at least an exit end of the body comprises at least one material comprising a melting point higher than a melting point of quartz is provided.

In certain embodiments, the at least one material comprises a melting point at least 5% higher, 10% higher, 15% higher, 20% higher, 25% higher or more than the melting point of quartz. For example, the material can be a machinable glass ceramic such as, for example, Macor® machine glass ceramic commercially available from MTC Wesgo Duramic. In some embodiments, the entire body comprises the at least one material comprising the melting point higher than the melting point of quartz. In certain examples, the body comprises an opening configured to receive an optically transparent material. In other embodiments, the body comprises an outer tube and an inner tube within the outer tube, in which the at least one material comprising the melting point higher than the melting point of quartz is present on one of the inner tube and the outer tube. In some examples, the body comprises an outer tube and an inner tube within the outer tube, in which the at least one material comprising the melting point higher than the melting point of quartz is present on both the inner tube and the outer tube. In certain examples, the body comprises a material other than the at least one material comprising the melting point higher than the melting point of quartz at an entrance end of the torch. In further examples, the materials are coupled to each other with an adhesive or a cement. In additional examples, the materials are fused to each other. In some embodiments, the materials are coupled to each other through a frit or a ground glass joint. In certain examples, the torch can include an optically transparent window in the body. In other examples, the optically transparent window comprises an effective size for use with a fiber optic device. In certain embodiments, the optically transparent window comprises an effective size for viewing of an atomization source in the body with the unaided human eye.

In an additional aspect, a torch comprising a hollow cylindrical outer tube and a hollow cylindrical inner tube within the hollow cylindrical outer tube, the hollow cylindrical outer tube comprising a fluid inlet configured to receive a cooling gas flow to cool outer surfaces of the hollow cylindrical inner tube, the hollow cylindrical inner tube configured to receive a gas effective to sustain an atomization source in the hollow tube, in which an exit end of the hollow cylindrical outer tube comprises at least one material comprising a melting point higher than a melting point of quartz is described. In certain embodiments, the at least one material comprises a melting point at least 5% higher, 10% higher, 15% higher, 20% higher, 25% higher or more than the melting point of quartz. In some embodiments, the entire body comprises the at least one material comprising the melting point higher than the melting point of quartz.

In another aspect, a torch comprising a hollow cylindrical tube with an entrance end and an exit end comprising at least one material comprising a melting point higher than a melting point of quartz, in which the entrance end and the exit end are coupled to each other to provide a substantially fluid tight seal between the entrance end and the exit end is described. In certain embodiments, the at least one material comprises a melting point at least 5% higher, 10% higher, 15% higher, 20% higher, 25% higher or more than the melting point of quartz. In some embodiments, the entire body comprises the at least one material comprising the melting point higher than the melting point of quartz.

In an additional aspect, a torch comprising an outer tube comprising at least one material comprising a melting point higher than a melting point of quartz, and an optically transparent window in the outer tube is provided. In certain embodiments, the at least one material comprises a melting point at least 5% higher, 10% higher, 15% higher, 20% higher, 25% higher or more than the melting point of quartz. In some embodiments, the entire body comprises the at least one material comprising the melting point higher than the melting point of quartz. In certain examples, the melting point of the at least one material comprising the melting point higher than the melting point of quartz is at least 600° C., 625° C., 650° C., 675° C., 700° C., 725° C., 750° C., 775° C., 800° C., 825° C., 850° C., 875° C., 900° C., 925° C., 950° C., 975° C., 1000° C., 1100° C., 1200° C., 1300° C., 1400° C. or at least 1500° C.

In certain embodiments, the torches described herein can include two or more different materials with one of the materials generally being resistant to temperature degradation. For example, the torches can include quartz, e.g., HLQ270V8 quartz, coupled to a nitride, e.g., silicon nitride, a refractory material or other materials. In some embodiments, the two different materials can be coupled to each other through an interstitial material that can be effective to reduce the expansion or contraction differences that may result from different coefficients of thermal expansion (CTE) of the different materials. For example, the torch may include quartz coupled to silica nitride at a tip of the torch. The silica nitride tip can be coupled to the quartz using an interstitial material such as, for example, high temperature bonding materials, high temperature frits, ground glass or other suitable materials. In other instances, the tip and the quartz body can be coupled to each other at an elevated temperature to reduce the likelihood of CTE mismatch causing early deterioration of the torch.

Additional features, aspect, examples and embodiments are described in more detail below.

BRIEF DESCRIPTION OF THE FIGURES

Certain embodiments are described with reference to the accompanying figures in which.

It will be recognized by the person of ordinary skill in the art, given the benefit of this disclosure, that certain dimensions or features of the torches may have been enlarged, distorted or shown in an otherwise unconventional or non-proportional manner to provide a more user friendly version of the figures.

DETAILED DESCRIPTION

Certain embodiments are described below with reference to singular and plural terms in order to provide a user friendly description of the technology disclosed herein. These terms are used for convenience purposes only and are not intended to limit the torches, methods and systems described herein.

In certain examples, the torches described herein can include one or more glass materials coupled to one or more other glass materials or non-glass materials which may have a higher melting point that the base glass material. Illustrative glass materials are commercially available from numerous sources including, but not limited to, Precision Electronics Glass (Vineland, N.J.) and may include, for example, quartz glasses or other suitable glasses.

Certain examples of the torches described herein can permit lower gas flows due to the higher temperature tolerances of the torches. By using lower gas flows, e.g., lower cooling gas flows, the atomization sources may operate at even higher temperatures, which can provide enhanced atomization and/or ionization efficiencies and improved detection limits. In some embodiments, the torches described herein may permit a flow rate reduction of 10%, 25%, 50% or more compared to conventional flow rates used with quartz torches.

Figure 1:
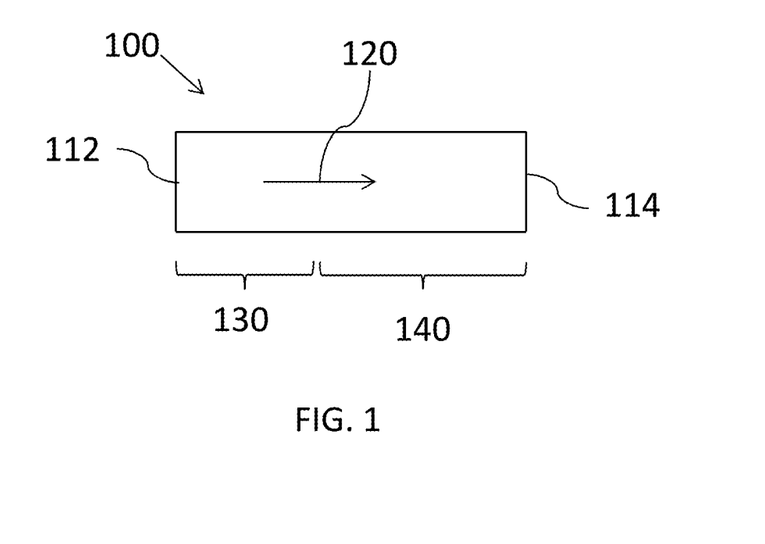
FIG. 1 is an illustration of a torch, in accordance with certain examples.

In certain embodiments, a side view of an illustration of a body of a torch is shown in FIG. 1. The torch generally includes a body or outer tube 100 that comprises a quartz or glass material. The torch is generally configured to sustain an atomization source using a gas such as argon, nitrogen, hydrogen, acetylene or combinations of them or other suitable gases. In some examples the atomization source can be a plasma, a flame, an arc or other suitable atomization sources. In one embodiment, the atomization source can be an inductively coupled plasma which can be sustained using an induction coil, flat plate electrodes or other suitable induction devices as described herein. Referring again to FIG. 1, the outer tube 100 comprises an entrance end 112 and an exit end 114. Gas is provided to the torch through the entrance end 112 and exits the torch 114 at the exit end with the gas flowing generally in the direction of arrow 120. The gas may enter the torch through one or more side ports (not shown) or through a port generally parallel to the longitudinal axis of the outer tube 100. For ease of description, the outer tube 100 can be divided into a first section 130 and a second section 140. The first section 130 is generally the section of the torch where sample desolvation occurs, and the section 140 of the torch is the section that is subjected to high temperatures from the atomization source. The section 140 may become devitrified, degrade or otherwise render the torch unsuitable for further use.

In some embodiments, at least an effective amount of the section 140 can include a refractory material. The term refractory material refers to a material that retains its physical properties at high temperatures, e.g., at or above 1000° F. Refractory materials typically comprise a non-metallic species which may be in the form of an oxide. In some embodiments, the refractory material used in the torches described herein can be an acidic, neutral or basic refractory material. These terms generally refer to the environment that the refractory material is suitable for use in. For example, an acidic refractory material is one suitable for use in an acidic environment. In some embodiments, an acid may be present in the sample and/or solvent stream including, for example, nitric acid, sulfuric acid, hydrochloric acid, aqua regia, hydrofluoric acid and/or phosphoric acid which, in some instances, can be present from 1-10%, e.g., 2-5%. In other embodiments, organics such as kerosene, gasoline, and jet fuel can be preset in the sample and/or solvent. High solids such as salts, brines, sulfates, and high metal concentrations may also be present in certain instances.

Illustrative acidic refractory materials include, but are not limited to, silica ($SiO_2$), zirconia ($ZrO_2$), alumina ($Al_2O_3$), fire-clay refractories and the like. Illustrative neutral refractory materials include, but are not limited to, alumina ($Al_2O_3$), chromia ($Cr_2O_3$) and refractory materials comprising carbon. Illustrative basic refractory materials include, but are not limited, magnesia (MgO), dolomite, and chrome-magnesia. While quartz may be considered a refractory material by certain sources, for purposes of this disclosure quartz is intentionally not included in the term "refractory material." For example, the term refractory material, as used herein, refers to refractory materials other than quartz. In some embodiments, the refractory material may be a refractory material that is effective to be exposed to a temperature of 600° C. or more without substantial degradation. While not wishing to be bound by any particular scientific theory, quartz generally degrades at about 570° C. If desired, the section 140 may have more than one type of refractory material, e.g., a first segment may include one type of refractory material and a second segment may include a different type of refractory material or different refractory materials may be coated or layered into the inner surfaces of the section 140.

In some embodiments, the refractory material may be coated onto an inner surface of the tube 100 in an effective length and/or effective thickness to prevent degradation of the materials comprising the outer portion of the torch section 140, e.g., to prevent degradation of any quartz present in the outer tube 140. While the exact length of the refractory material may vary, in some embodiments, the refractory material may extend about 15 mm to about 40 mm into the body of the torch from the exit end, e.g., about 15-27 mm or 26 mm into the body of the torch from the exit end 114 of the torch. In other embodiments, the refractory material may extend about 15 mm to about 30 mm into the body of the torch from the exit end 114 of the torch. In some instances, the refractory material may extend from the exit end into the torch body about the same length as a slot present in the torch body. In certain embodiments, the illustrative dimensions provided herein for the refractory material may also be used where the material present is a material comprising a melting point higher than the melting point of quartz.

In certain examples, the particular thickness of the refractory coating on the section 140 of the tube 100 may vary and the coating is not necessarily the same thickness along the longitudinal axis direction of the tube 100. The section 140 may experience higher temperatures at regions adjacent to the desolvation region 130 and lower temperatures at regions adjacent to the exit end 114 of the tube 100. The thickness adjacent to the end 114 may be less than the thickness present near the desolvation region 130 to account for the differences in temperature at different regions of the tube 100. While the exact longitudinal length of the desolvation region may vary, in certain embodiments, it may be about 11-15 from one end of the desolvation region to the other. In certain examples, a refractory material, or a material comprising a melting point higher than a melting point of quartz, may be present from where the desolvation region ends to the exit end 114.

In certain embodiments, the section 140 of the tube 100 may substantially comprise a refractory material. For example, the section 140 can include a solid body of refractory material that can be coupled to the section 130, which itself may be a refractory material or a non-refractory material. In some embodiments, the refractory material section can be coupled to the desolvation region section through an adhesive, a frit, a ground glass joint, can be fused to the desolvation region section or is otherwise coupled to the desolvation region section to provide a substantially fluid tight seal so gas does not leak out at the joint.

Figure 2:
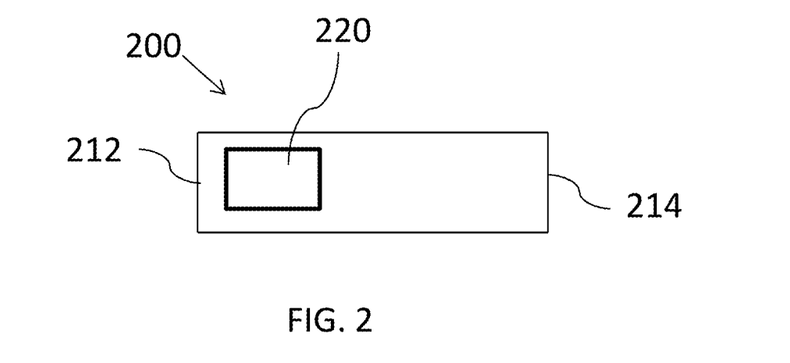
FIG. 2 is an illustration of a torch comprising a terminal portion comprising a refractory material, in accordance with certain examples.

In some embodiments, substantially all of the outer tube can comprise a refractory material, e.g., a solid body of refractory material. In some instances, it may be desirable to include one or more optically transparent windows in the tube to permit viewing of the atomization source. Referring to FIG. 2, a torch comprising an outer tube 200 that comprises a generally solid body of refractory material with an entrance end 212 and an exit end 214. The tube 200 can include an optically transparent window 220 to permit viewing of atomization source. For example, it may be desirable to view the atomization source to permit adjustment of the gas flows and or adjust the position of the torch within the induction device, if present. In some embodiments, the systems described herein can include one or more safety mechanisms that automatically shut off the power to the induction device or components thereof, e.g., a generator, and/or shut off the gas flows if the atomization source extinguishes. In such instances, an optically transparent window can permit optical monitoring of the atomization source to ensure it still remains present in the torch. In some instances, more than a single optically transparent window can be present if desired.

In certain examples, the exact dimensions of the optically transparent window can vary from torch to torch and system to system. In some embodiments, the optically transparent window is large enough to permit viewing of the atomization source with the unaided human eye from a distance of about 3-5 feet. In other embodiments, the optically transparent window may comprise dimensions of about 9 mm to about 18 mm, for example, about 12 mm to about 18 mm. The exact shape of the optically transparent window can vary from rectangular, elliptical, circular or other geometric shapes can be present. The term "window" is used generally, and in certain instances the window may take the form of a circular hole that has been drilled radially into the torch. The drilled hole can be sealed with an optically transparent material to provide a substantially fluid tight seal. In certain embodiments, the optically transparent window may comprise quartz or other generally transparent materials that can withstand temperatures of around 500-550° C. or higher. In some embodiments, an optical element such as, for example, a lens, mirror, fiber optic device or the like can be optically coupled to the hole or window to collect or receive light (or a signal) provided by the atomization source.

Figure 3:
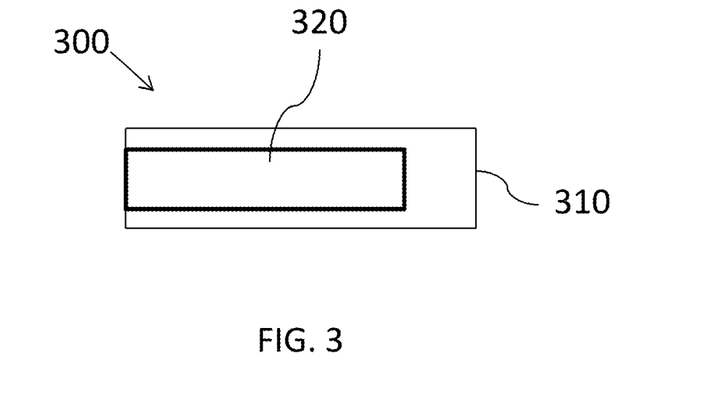
FIG. 3 is an illustration of a torch comprising an outer tube and an inner tube, in accordance with certain examples.

In certain embodiments, the torches described herein can also include an inner tube positioned in an outer tube. In some embodiments, the atomization source can be sustained at a terminal portion of the inner tube, and a cooling gas may be provided to cool the tubes of the torch. Referring to FIG. 3, a torch 300 comprises an outer tube 310 and an inner tube 320 within the outer tube 310. As described herein, one or more refractory materials may be present on an exit end of the outer tube 320 to prevent degradation of the exit end. If desired, some or all of the inner tube 320 may also include one or more refractory materials, e.g., at an exit end of the inner tube or substantially all of the inner tube may comprise a refractory material. Where a refractory material is present in the inner tube, it may be the same or may be different than the refractory material present in the outer tube. Where the inner tube comprises a generally solid refractory material body, an optically transparent window can be present on the inner tube and the outer tube. If desired, at least some degree of the optically transparent windows of the inner and outer tubes can be aligned so the atomization source in the torch can be viewed by a user.

Figure 4:
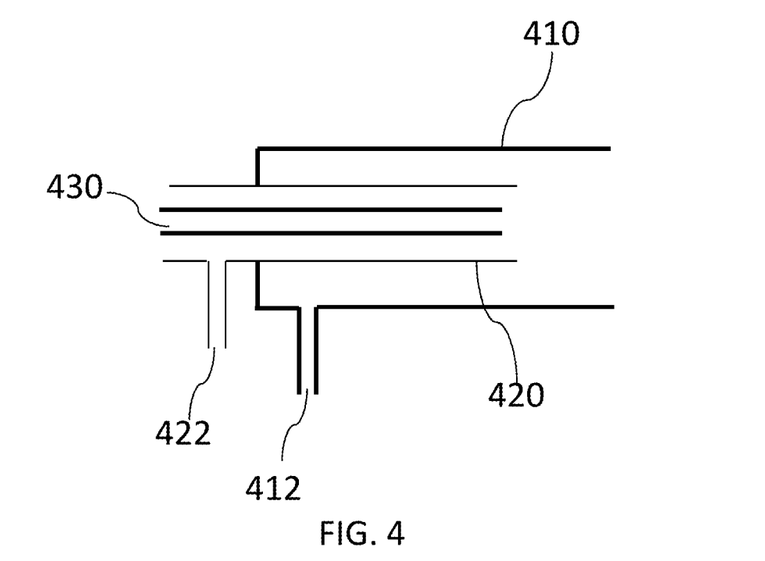
FIG. 4 is a side view of a Fassel torch, in accordance with certain examples.

In certain embodiments, the torches described herein can be used to sustain a plasma. Referring to FIG. 4, a simplified illustration of a torch 400 is shown. The torch 400 comprises an outer tube 410 comprising a fluid inlet 412 at an entrance end, and an inner tube 420 comprising a fluid inlet 422 at an entrance end. The torch 400 can receive a nebulizer 430 or other sample introduction device. In operation, a plasma gas can be introduced through the fluid inlet 412, an intermediate gas can be introduced through the fluid inlet 422, and a nebulizer gas and sample can be introduced using the nebulizer 430. One or more types of induction devices, e.g., a helical induction coil, flat plate electrodes or other suitable devices can be used to sustain the plasma adjacent to the exit end of the nebulizer 430 and the exit end of the inner tube 420. The area or region of the outer tube 410 where the plasma is sustained may comprise one or more refractory materials as described herein. The area of the outer tube 410 that surrounds the inner tube 420 may comprise a non-refractory material, e.g., quartz, or may comprise a refractory material and an optically transparent window as described herein. In some embodiments, the segments of the outer tube 410 may be fused, adhered to each other, coupled to each other through a frit, a ground glass joint or intermediate material or otherwise joined to each other to provide a substantially fluid tight seal. In some embodiments, the outer tube 410 may comprise a generally solid quartz tube with a coating of refractory material on the inner surfaces where the plasma is sustained. The exact length of the coating may vary, but in certain instances, the coating may extend from an exit end of the outer tube 410 to the area immediately underlying the exit end of the inner tube 420. The exact thickness of the coating may also vary but the coating is desirably not so thick as to interfere with the gas flows through the torch 400.

In certain embodiments, the torches described herein can be present in a system configured to detect one or more species that have been atomized and/or ionized by the atomization source. In some embodiments, the system comprises a torch comprising a hollow cylindrical outer tube comprising an entrance end and an exit end, in which the exit end of the outer tube comprises a refractory material in an effective length and/or an effective amount to prevent degradation of the exit end of the torch. In certain embodiments, the system can also include an induction device comprising an aperture configured to receive the torch and provide radio frequency energy to the torch to sustain the atomization source in the torch.

Figure 5:
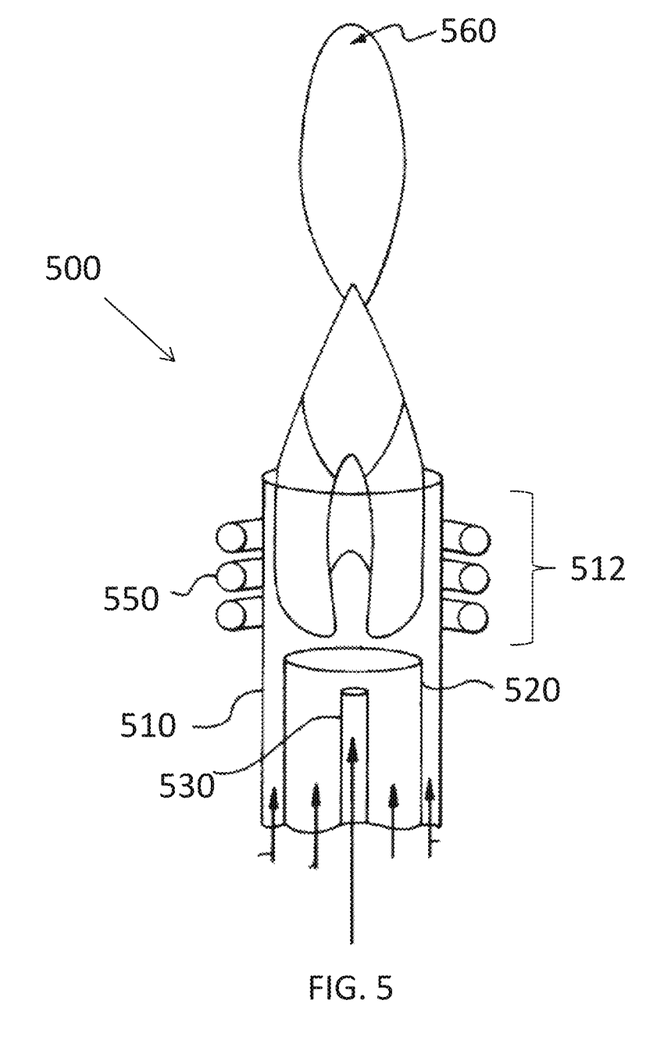
FIG. 5 is an illustration of a system comprising a torch and a helical induction coil, in accordance with certain examples.

In some examples, the induction device may be a helical coil as shown in FIG. 5. The system 500 comprises a torch comprising an outer tube 510, an inner tube 520, a nebulizer 530 and a helical induction coil 550. The system 500 can be used to sustain a plasma 560 using the gas flows shown generally by the arrows in FIG. 5. The region 512 of the outer tube 510 may comprise a refractory material coating or may comprise a generally solid body of refractory material. The helical induction coil 550 may be electrically coupled to a radio frequency energy source to provide radio frequency energy to the torch to sustain a plasma 560 within the torch. In some embodiments, optical emission from excited, atomized or ionized species in the plasma can be detected using a suitable detector. If desired, species in the plasma can be provided to a different instrument or device as described herein.

Figure 6:
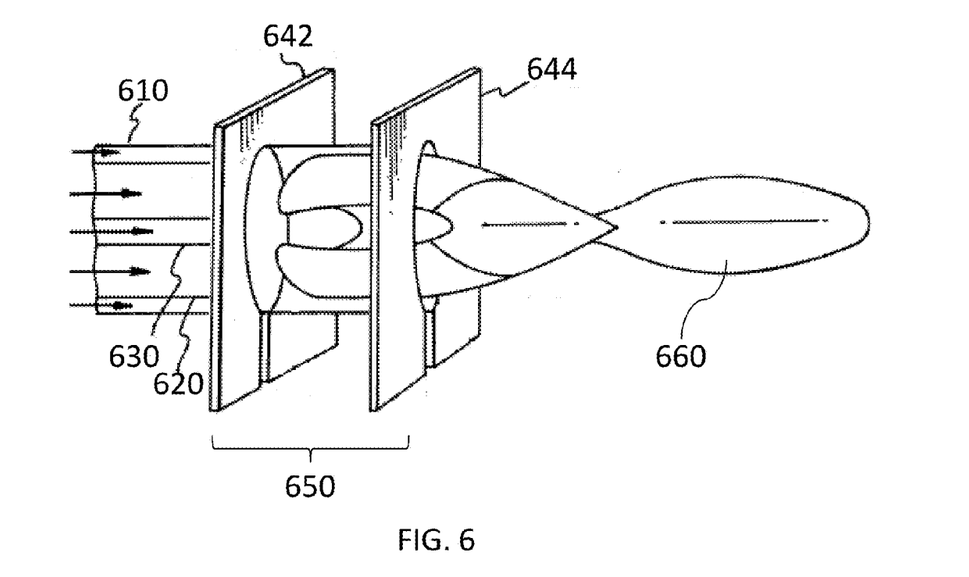
FIG. 6 is an illustration of a system comprising a torch and a flat plate electrode in accordance with certain examples.

In some embodiments, the induction device may comprise one or more plate electrodes. For example and referring to FIG. 6, a system 600 comprises an outer tube 610, an inner tube 620, a nebulizer 630 and a plate electrode 642. An optional second plate electrode 644 is shown as being present, and, if desired, three or more plate electrodes may also be present. The outer tube 610 can be positioned within apertures of the plate electrodes 642, 644 as shown in FIG. 6. The system 600 can be used to sustain a plasma 660 using the gas flows shown by the arrows in FIG. 6. The region 650 of the outer tube 610 may comprise a refractory material coating or may comprise a generally solid body of refractory material. The plate electrode(s) may be electrically coupled to a radio frequency energy source to provide radio frequency energy to the torch to sustain a plasma 660 within the torch. In some embodiments, optical emission from excited, atomized or ionized species in the plasma can be detected using a suitable detector. If desired, species in the plasma can be provided to a different instrument or device as described herein.

In certain embodiments, the torches described herein can be used in a system configured to perform mass spectrometry (MS). For example and referring to FIG. 7, MS device 700 includes a sample introduction device 710, an atomization device 720 which can comprise one or more of the torches described herein, a mass analyzer 730, a detection device 740, a processing device 750 and a display 760. The sample introduction device 710, the atomization device 720, the mass analyzer 730 and the detection device 740 may be operated at reduced pressures using one or more vacuum pumps. In certain examples, however, only the mass analyzer 730 and the detection device 740 may be operated at reduced pressures.

Figure 7:
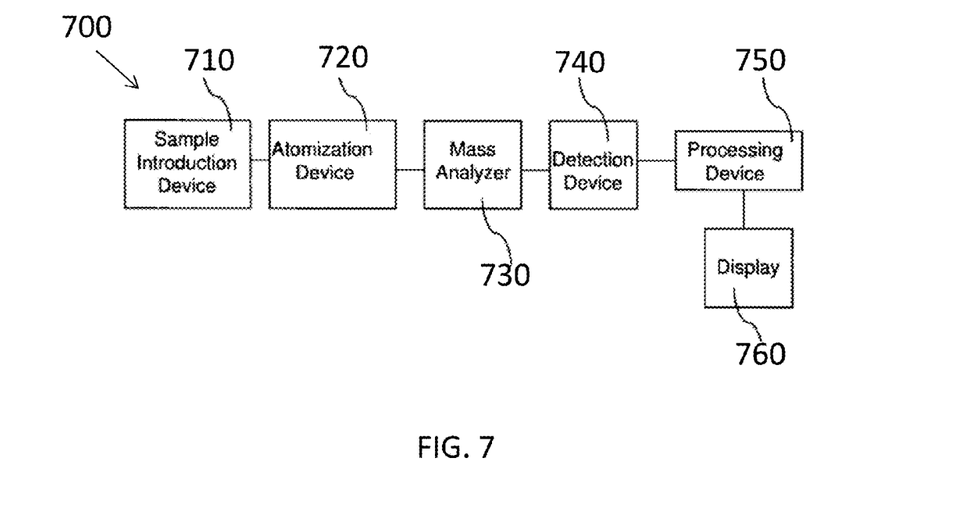
FIG. 7 is an illustration of a system mass spectrometry system, in accordance with certain examples.

The sample introduction device 710 may include an inlet system configured to provide sample to the atomization device 720. The inlet system may include one or more batch inlets, direct probe inlets and/or chromatographic inlets. The sample introduction device 710 may be an injector, a nebulizer or other suitable devices that may deliver solid, liquid or gaseous samples to the atomization device 720. The atomization device 720 may comprise any one of or more of the torches described herein that include a refractory material in some part of the torch, e.g., at an exit end of an outer tube of the torch. The mass analyzer 730 may take numerous forms depending generally on the sample nature, desired resolution, etc. and exemplary mass analyzers are discussed further below. The detection device 740 may be any suitable detection device that may be used with existing mass spectrometers, e.g., electron multipliers, Faraday cups, coated photographic plates, scintillation detectors, etc., and other suitable devices that will be selected by the person of ordinary skill in the art, given the benefit of this disclosure. The processing device 750 typically includes a microprocessor and/or computer and suitable software for analysis of samples introduced into MS device 700. One or more databases may be accessed by the processing device 750 for determination of the chemical identity of species introduced into MS device 700. Other suitable additional devices known in the art may also be used with the MS device 700 including, but not limited to, autosamplers, such as AS-90plus and AS-93plus autosamplers commercially available from PerkinElmer Health Sciences, Inc.

Figure 8:
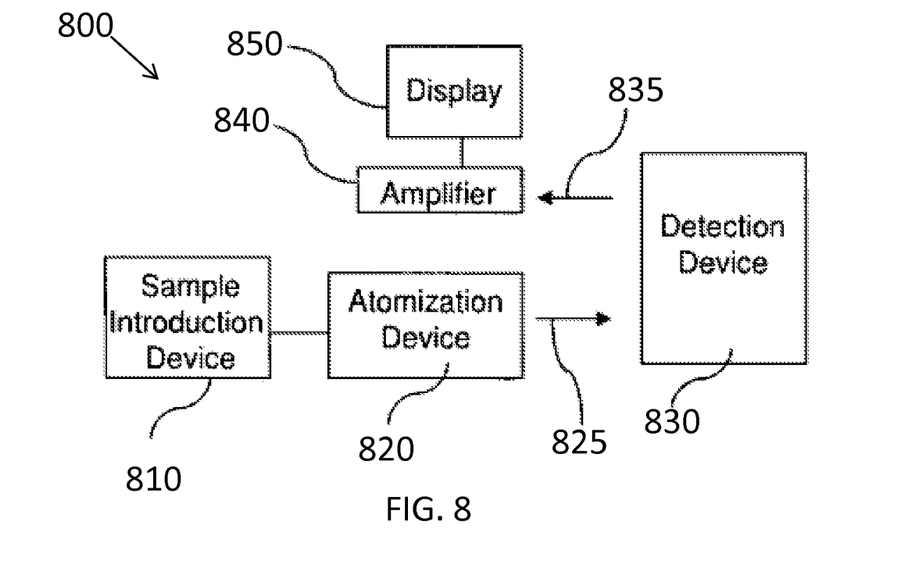
FIG. 8 is an illustration of an optical emission spectrometer, in accordance with certain examples.

In certain embodiments, the torches described herein can be used in optical emission spectroscopy (OES). Referring to FIG. 8, OES device 800 includes a sample introduction device 810, an atomization device 820 comprising one of the torches described herein, and a detection device 830. The sample introduction device 810 may vary depending on the nature of the sample. In certain examples, the sample introduction device 810 may be a nebulizer that is configured to aerosolize liquid sample for introduction into the atomization device 820. In other examples, the sample introduction device 810 may be an injector configured to receive sample that may be directly injected or introduced into the atomization device 820. Other suitable devices and methods for introducing samples will be readily selected by the person of ordinary skill in the art, given the benefit of this disclosure. The detection device 830 may take numerous forms and may be any suitable device that may detect optical emissions, such as optical emission 825. For example, the detection device 830 may include suitable optics, such as lenses, mirrors, prisms, windows, band-pass filters, etc. The detection device 830 may also include gratings, such as echelle gratings, to provide a multi-channel OES device. Gratings such as echelle gratings may allow for simultaneous detection of multiple emission wavelengths. The gratings may be positioned within a monochromator or other suitable device for selection of one or more particular wavelengths to monitor. In certain examples, the detection device 830 may include a charge coupled device (CCD). In other examples, the OES device may be configured to implement Fourier transforms to provide simultaneous detection of multiple emission wavelengths. The detection device may be configured to monitor emission wavelengths over a large wavelength range including, but not limited to, ultraviolet, visible, near and far infrared, etc. The OES device 800 may further include suitable electronics such as a microprocessor and/or computer and suitable circuitry to provide a desired signal and/or for data acquisition. Suitable additional devices and circuitry are known in the art and may be found, for example, on commercially available OES devices such as Optima 2100DV series and Optima 5000 DV series OES devices commercially available from PerkinElmer Health Sciences, Inc. The optional amplifier 840 may be operative to increase a signal 835, e.g., amplify the signal from detected photons, and provides the signal to display 850, which may be a readout, computer, etc. In examples where the signal 835 is sufficiently large for display or detection, the amplifier 840 may be omitted. In certain examples, the amplifier 840 is a photomultiplier tube configured to receive signals from the detection device 830. Other suitable devices for amplifying signals, however, will be selected by the person of ordinary skill in the art, given the benefit of this disclosure. It will also be within the ability of the person of ordinary skill in the art, given the benefit of this disclosure, to retrofit existing OES devices with the atomization devices disclosed here and to design new OES devices using the atomization devices disclosed here. The OES devices may further include autosamplers, such as AS90 and AS93 autosamplers commercially available from PerkinElmer Health Sciences, Inc. or similar devices available from other suppliers.

Figure 9:
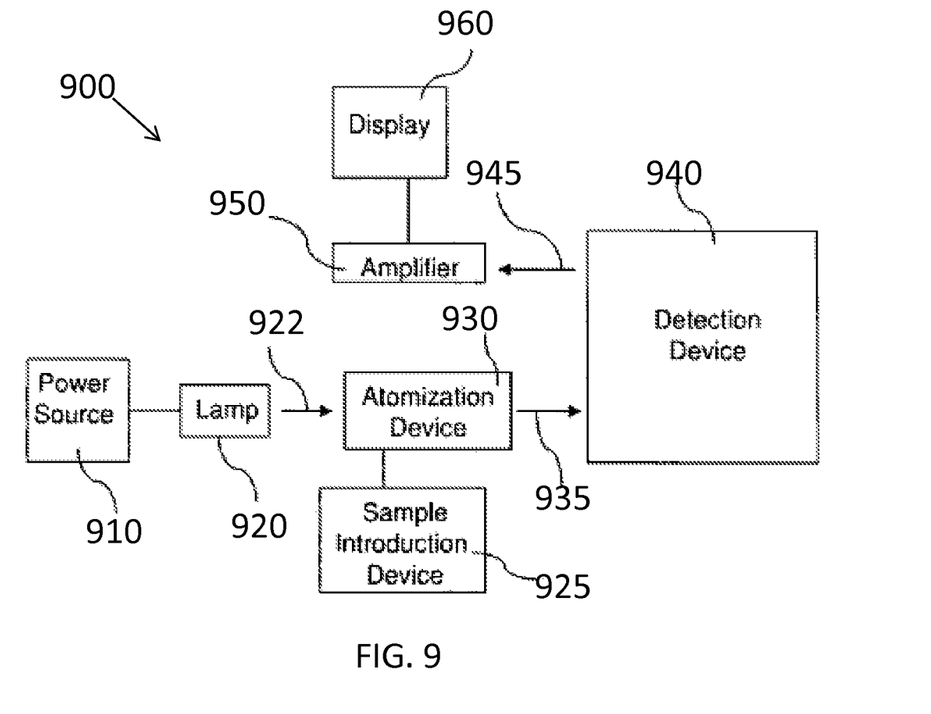
FIG. 9 is an illustration of an atomic absorption spectrometer, in accordance with certain examples.

In certain examples, the torches described herein can be used in an atomic absorption spectrometer (AAS). Referring to FIG. 9, a single beam AAS 900 comprises a power source 910, a lamp 920, a sample introduction device 925, an atomization device 930 comprising one of the torches described herein, a detection device 940, an optional amplifier 950 and a display 960. The power source 910 may be configured to supply power to the lamp 920, which provides one or more wavelengths of light 922 for absorption by atoms and ions. Suitable lamps include, but are not limited to mercury lamps, cathode ray lamps, lasers, etc. The lamp may be pulsed using suitable choppers or pulsed power supplies, or in examples where a laser is implemented, the laser may be pulsed with a selected frequency, e.g. 5, 10, or 20 times/second. The exact configuration of the lamp 920 may vary. For example, the lamp 920 may provide light axially along the torch body of the atomization device 930 or may provide light radially along the atomization device 930. The example shown in FIG. 9 is configured for axial supply of light from the lamp 920. As discussed above, there may be signal-to-noise advantages using axial viewing of signals. The atomization device 930 may be any of the atomization devices discussed herein or other suitable atomization devices including a boost device that may be readily selected or designed by the person of ordinary skill in the art, given the benefit of this disclosure. As sample is atomized and/or ionized in the atomization device 930, the incident light 922 from the lamp 20 may excite atoms. That is, some percentage of the light 922 that is supplied by the lamp 920 may be absorbed by the atoms and ions in the torch of atomization device 930. The segment of the torch that includes the refractory material may include one or more optical windows, if desired, to permit receipt and/or transmission of light from the lamp 920. The remaining percentage of the light 935 may be transmitted to the detection device 940. The detection device 940 may provide one or more suitable wavelengths using, for example, prisms, lenses, gratings and other suitable devices such as those discussed above in reference to the OES devices, for example. The signal may be provided to the optional amplifier 950 for increasing the signal provided to the display 960. To account for the amount of absorption by sample in the atomization device 930, a blank, such as water, may be introduced prior to sample introduction to provide a 100% transmittance reference value. The amount of light transmitted once sample is introduced into atomization chamber may be measured, and the amount of light transmitted with sample may be divided by the reference value to obtain the transmittance. The negative $\log_{10}$ of the transmittance is equal to the absorbance. AS device 900 may further include suitable electronics such as a microprocessor and/or computer and suitable circuitry to provide a desired signal and/or for data acquisition. Suitable additional devices and circuitry may be found, for example, on commercially available AS devices such as AAnalyst series spectrometers commercially available from PerkinElmer Health Sciences, Inc. It will also be within the ability of the person of ordinary skill in the art, given the benefit of this disclosure, to retrofit existing AS devices with the atomization devices disclosed here and to design new AS devices using the atomization devices disclosed here. The AS devices may further include autosamplers known in the art, such as AS-90A, AS-90plus and AS-93plus autosamplers commercially available from PerkinElmer, Inc. In certain embodiments, a double beam AAS device, instead of a single beam AAS device, comprising one of the torches described herein may be used to measure atomic absorption of species.

In certain embodiments, a method of reducing degradation of a torch can include providing a torch comprising a hollow cylindrical outer tube comprising an entrance end and an exit end, in which the exit end comprises an effective amount of a refractory material. In some examples, the refractory material can be configured to be present at an effective length in a longitudinal direction of the torch and along an internal surface of the outer tube of the torch. In other examples, the refractory material can be configured to be coated onto the inner surface of the outer tube of the torch. In some embodiments, the refractory material can be configured to be at least one of alumina, yttria, ceria, silicon nitride, boron nitride or refractory materials or ceramics that have working temperature greater than 1600 degrees Celsius or greater than 2000 degrees Celsius. In certain examples, the torch can be configured with a hollow cylindrical inner tube comprising an entrance end and an exit end, in which the exit end of the inner tube comprises an effective amount or an effective length or both of a refractory material.

In some examples, a method of reducing degradation of a torch configured to sustain an atomization source can include providing a torch comprising a hollow cylindrical outer tube comprising an entrance end and an exit end and a hollow cylindrical inner tube within the hollow cylindrical outer tube, in which the hollow cylindrical inner tube comprises an entrance end and an exit end and in which the exit end of the outer tube comprises an effective amount, an effective length or both of a refractory material. In certain embodiments, the method can include configuring the refractory material to be present at an effective length in a longitudinal direction of the torch and along an internal surface of the outer tube of the torch. In some examples, the method can include configuring the refractory material to be coated onto the inner surface of the outer tube of the torch. In certain embodiments, the method can include configuring the refractory material to be at least one of alumina, yttria, ceria, silicon nitride, boron nitride or refractory materials or ceramics that have working temperature greater than 1600 degrees Celsius or greater than 2000 degrees Celsius. In additional examples, the method can include configuring the torch with a hollow cylindrical inner tube comprising an entrance end and an exit end, in which the exit end of the inner tube comprises an effective amount, an effective length or both of a refractory material.

Certain specific examples are described below to illustrate further some of the novel aspects of the technology described herein.

EXAMPLE 1

Figure 10:
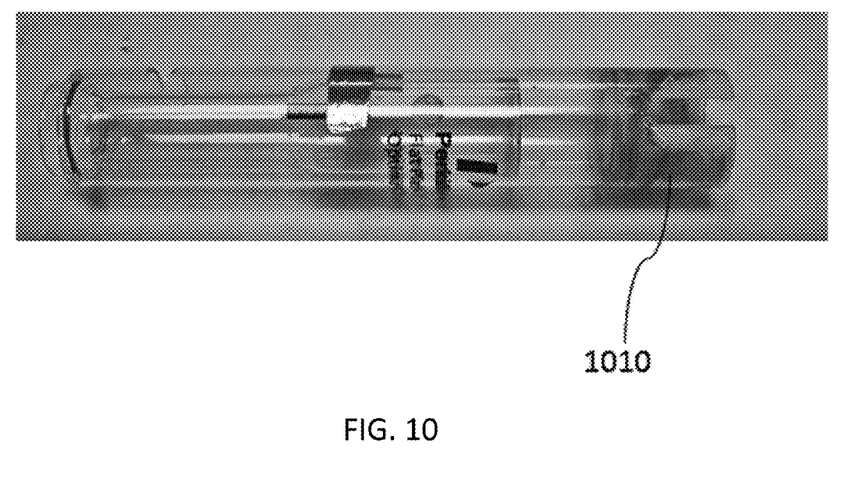
FIG. 10 is a photograph of a plasma torch showing devitrification of an exit end of the outer tube of the torch, in accordance with certain examples.

A photograph of a conventional plasma torch comprising a quartz outer tube is shown in FIG. 10. An exit end 1010 of the torch is shown as being degraded from exposure to the high plasma temperatures, which can result in devitrification of the exit end. Where lower cooling gas flows are used the devitrification issues can occur at faster rates. By using a refractory material coating on the surfaces shown as devitrified in FIG. 10, the torch lifetime can be greatly increased. Alternatively, the devitrified area can be replaced with a refractory material body to repair the torch and permit use of the new torch comprising the refractory material.

EXAMPLE 2

Figure 11:
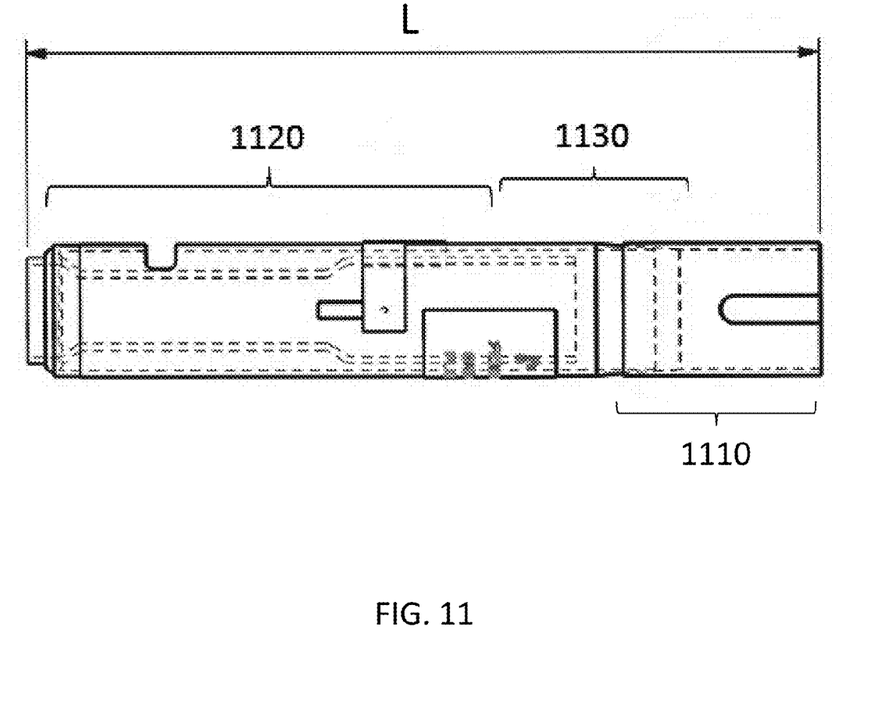
FIG. 11 is an illustration of a torch showing illustrative dimensions, in accordance with certain examples.

An illustration of a torch is shown in FIG. 11. The overall length L of the torch is about 120 mm. A tip 1110, e.g., a silicon nitride tip, is present from the end of the torch at a length of about 26 mm. A ground glass joint 1130 is present between a quartz body 1120 and the top 1110 and spans about 10 mm on the torch with about 2 mm of overlap with the tip 1110. If desired, the ground glass joint can be polished or otherwise rendered substantially optically transparent to permit better visualization of the plasma in the torch.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

The invention claimed is:

1. A torch comprising a body configured to sustain an atomization source in the body, the torch body comprising an inlet end within a first section of the torch body and an exit end within a second section of the torch body, in which the torch is configured to desolvate sample at the first section of the torch body and to sustain an atomization source within the second section of the torch body, in which the first section and the second section of the torch body are coupled to each other through at least one material, in which the first section of the torch body comprises a non-refractory material, in which at least an exit end within the second section of the torch body comprises at least one refractory material.

2. The torch of claim 1, in which the refractory material is coated onto the exit end of the torch body.

3. The torch of claim 1, in which the refractory material is present in an effective length along a longitudinal dimension of the second section of the torch body.

4. The torch of claim 3, in which the refractory material is present in an effective thickness at the exit end of the torch body.

5. The torch of claim 1, in which the entire second section of the torch body comprises the refractory material.

6. The torch of claim 5, in which the torch body comprises an opening within the second section comprising the refractory material that is configured to receive an optically transparent material.

7. The torch of claim 1, in which the torch body comprises an outer tube, comprising the first section and the second section, and an inner tube within the outer tube, in which the refractory material is present on the outer tube.

8. The torch of claim 1, in which the torch body comprises an outer tube, comprising the first section and the section, and an inner tube within the outer tube, in which the refractory material is present on both the inner tube and the outer tube.

9. The torch of claim 1, in which the torch body comprises a substantially constant diameter along a longitudinal dimension of the torch body and the refractory material of the second section and non-refractory material of the first section are coupled to each other with an adhesive or cement.

10. The torch of claim 1, in which the torch body comprises a substantially constant diameter along a longitudinal dimension of the torch body and refractory material of the second section and non-refractory material of the first section are further fused to each other.

11. The torch of claim 1, in which the torch body comprises a substantially constant diameter along a longitudinal dimension of the torch body and the refractory material of the second section and non-refractory material of the first section are coupled to each other through a frit or a ground glass joint.

12. A torch comprising a hollow cylindrical outer tube and a hollow cylindrical inner tube within the hollow cylindrical outer tube, the hollow cylindrical outer tube comprising a substantially constant diameter along a longitudinal dimension of the outer tube, and comprising a fluid inlet section configured to receive a cooling gas flow to cool outer surfaces of the hollow cylindrical inner tube, the hollow cylindrical inner tube configured to receive a gas effective to sustain an atomization source in the torch, in which the hollow cylindrical outer tube comprises an inlet section and an outlet section coupled to each other through at least one material, in which the inlet section of the hollow cylindrical outer tube comprises a non-refractory material, and in which an exit end of the hollow cylindrical outer tube comprises a refractory material.

13. The torch of claim 12, in which an exit end of the hollow cylindrical inner tube comprises a refractory material.

14. The torch of claim 12, in which an entrance end of the hollow cylindrical outer tube comprises a non-refractory material.

15. The torch of claim 14, in which the non-refractory material at the entrance end of the hollow cylindrical outer tube and the refractory material at the exit end of the hollow cylindrical outer tube are coupled to each other through the at least one material.

16. The torch of claim 15, in which the refractory material at the exit end of the hollow cylindrical outer tube and the non-refractory material at the entrance end of the outer tube are coupled to each other through one or more of an adhesive, a cement, a frit, a ground glass joint or are fused to each other.

17. The torch of claim 12, in which the outer tube comprises a slot extending into the outer tube for a slot length and the refractory material of the outer tube extends into the outer tube at a length about the same as the slot length.

18. The torch of claim 12, in which the refractory material is coated onto an inner surface of the exit end of the outer hollow cylindrical tube.

19. The torch of claim 12, in which the exit end comprises solid refractory material.

20. The torch of claim 17, in which the refractory material is only present on the outlet end of the torch with the length about the same as the slot length.

\* \* \* \* \*